(12) United States Patent
Xu et al.

(10) Patent No.: US 12,015,683 B2
(45) Date of Patent: Jun. 18, 2024

(54) METHOD, APPARATUS AND DEVICE FOR ISSUING AND REPLYING TO MULTIMEDIA CONTENT

(71) Applicant: BEIJING ZITIAO NETWORK TECHNOLOGY CO., LTD., Beijing (CN)

(72) Inventors: Jiannan Xu, Beijing (CN); Weiyi Chang, Beijing (CN); Chenlai Fu, Beijing (CN); Minghong Duan, Beijing (CN); Kun Zhang, Beijing (CN); Shaohua Yang, Beijing (CN); Weibin Xie, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/087,513

(22) Filed: Dec. 22, 2022

(65) Prior Publication Data

US 2023/0129847 A1  Apr. 27, 2023

Related U.S. Application Data

(63) Continuation of application No. PCT/CN2021/131474, filed on Nov. 18, 2021.

(30) Foreign Application Priority Data

Nov. 25, 2020 (CN) .......................... 202011346078.0

(51) Int. Cl.
*G06F 15/16* (2006.01)
*H04L 67/306* (2022.01)
*H04L 67/55* (2022.01)

(52) U.S. Cl.
CPC ............ *H04L 67/55* (2022.05); *H04L 67/306* (2013.01)

(58) Field of Classification Search
CPC ...... H04L 67/55; H04L 67/306; H04L 51/216
(Continued)

(56) References Cited

U.S. PATENT DOCUMENTS 10,834,043 B1 * 11/2020 Paul ........................ H04L 51/52
10,868,788 B1 * 12/2020 Underwood ............ H04L 67/30
(Continued)

FOREIGN PATENT DOCUMENTS

CN          101005595 A    7/2007
CN          105592150 A    5/2016
(Continued)

OTHER PUBLICATIONS

First Office Action dated Jan. 24, 2022 in Chinese Application No. 202011346078.0, with English translation (20 pages).
(Continued)

*Primary Examiner* — Alan S Chou

(57) ABSTRACT

A method, an apparatus, a device, and a storage medium for issuing and replying to multimedia content are provided here. The method described herein for issuing multimedia content comprises: receiving push content associated with a user, the push content being generated based on an the occurrence of a personalized event associated with the user; presenting the push content to the user, the push content comprising video content related to the personalized event; and issuing multimedia content associated with the personalized event based on an operation on the push content by the user, the multimedia content being generated based on the push content. According to the embodiments of the present disclosure, it can effectively help a user to create multimedia content associated with a personalized event, reduce the time cost for the user, and can effectively guide interaction between users, thereby improving user experience.

18 Claims, 8 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2008/0215984 A1 | 9/2008 | Manico et al. | |
| 2012/0265758 A1 | 10/2012 | Han et al. | |
| 2015/0334168 A1* | 11/2015 | Kosslyn | G06Q 50/01 709/204 |
| 2016/0034459 A1 | 2/2016 | Larsen et al. | |
| 2016/0197870 A1* | 7/2016 | Liu | H04L 51/52 709/206 |
| 2017/0180294 A1 | 6/2017 | Milligan et al. | |
| 2018/0239823 A1* | 8/2018 | Singh | G06F 16/951 |
| 2018/0270283 A1 | 9/2018 | Bostick et al. | |
| 2019/0138656 A1* | 5/2019 | Yang | G06N 3/045 |
| 2019/0303403 A1 | 10/2019 | More et al. | |
| 2021/0409357 A1* | 12/2021 | Brody | H04L 51/10 |

FOREIGN PATENT DOCUMENTS

| | | |
|---|---|---|
| CN | 106537389 A | 3/2017 |
| CN | 106713950 A | 5/2017 |
| CN | 107113222 A | 8/2017 |
| CN | 109241340 A | 1/2019 |
| CN | 109348299 A | 2/2019 |
| CN | 109416685 A | 3/2019 |
| CN | 109525896 A | 3/2019 |
| CN | 110213504 A | 9/2019 |
| CN | 111061984 A | 4/2020 |
| CN | 112492355 A | 3/2021 |
| JP | 2009157776 A | 7/2009 |
| JP | 2020518896 A | 6/2020 |
| KR | 10-2011-0069019 | 6/2011 |

OTHER PUBLICATIONS

Second Office Action dated Mar. 30, 2022 in Chinese Application No. 202011346078.0, with English translation (15 pages).
Notice of Grant dated Jun. 8, 2022 in Chinese Application No. 202011346078.0, with English translation (5 pages).
International Search Report dated Feb. 10, 2022 in International Application No. PCT/CN2021/131474, with English translation (6 pages).
Office Action dated Jul. 5, 2023 in Japanese Application No. 2022-579938, with English translation (11 pages).
Office Action dated Jun. 5, 2023 in Korean Application No. 10-2023-7004589, with English translation (10 pages).
Notice of Reasons for Refusal dated Dec. 12, 2023 in Japanese Application No. 2022-579938, with English translation (18 pages).
Extended European Search Report dated Jan. 20, 2024 in European Application No. 21896877.4.

* cited by examiner

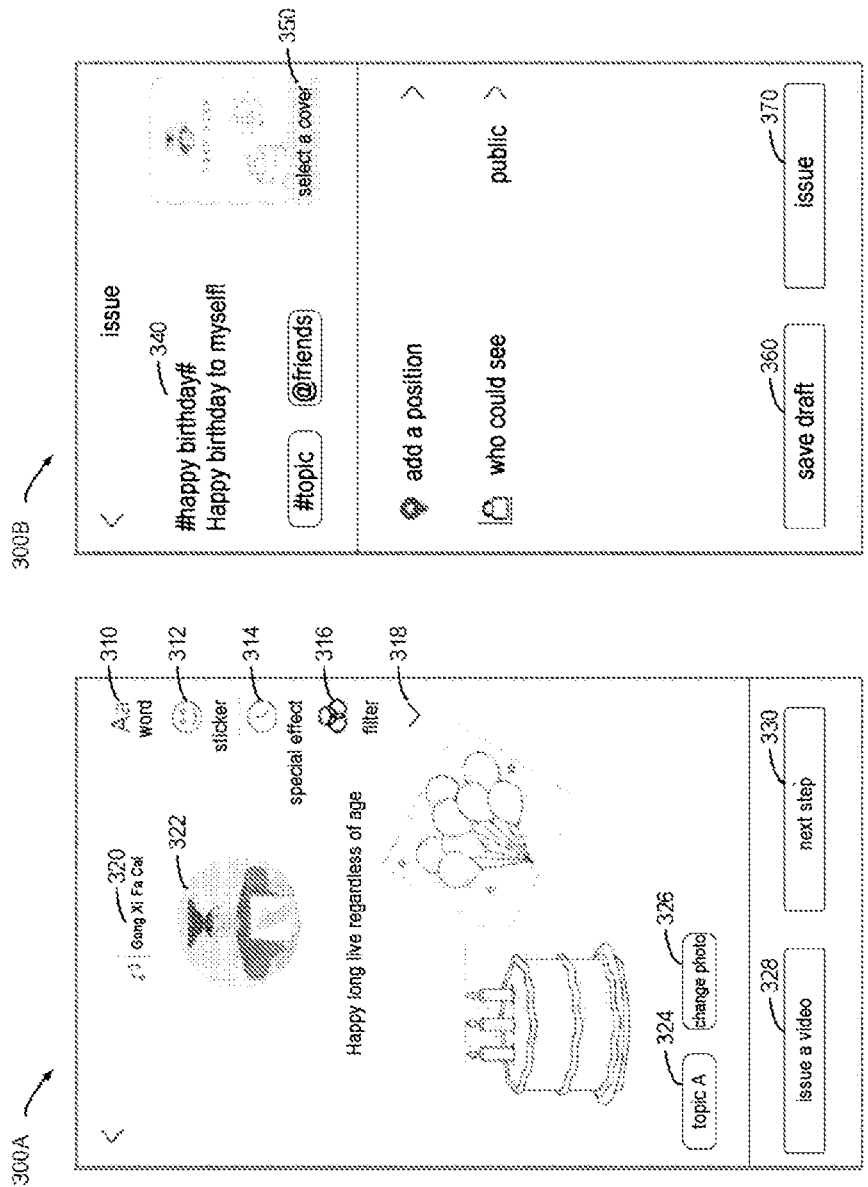

METHOD, APPARATUS AND DEVICE FOR ISSUING AND REPLYING TO MULTIMEDIA CONTENT

CROSS-REFERENCE TO RELATED APPLICATION

The present disclosure claims the priority of Chinese patent application CN202011346078.0, filed on Nov. 25, 2020 and entitled "METHOD, APPARATUS AND DEVICE FOR ISSUING AND REPLYING TO MULTIMEDIA CONTENT", the entire contents of which are incorporated herein by reference.

TECHNICAL FIELD

Embodiments of the present disclosure generally relate to a field of computer, and more specifically, to a method, an apparatus and a device for issuing and replying to a multimedia content.

BACKGROUND

With the development of information technology, the Internet has become an important way for people to obtain information. Various applications can provide people with different types of content, such as news, music, pictures, or videos.

At present, some multimedia applications can also provide a platform for users to create, share, view, or comment on a multimedia content. Usually, a user needs to perform a series of complicated operations while creating the multimedia content, which affect the user's enthusiasm for creating. In addition, when some special dates come, the user may not notice the special days, or have no motivation to create the related multimedia content due to cumbersome operations.

SUMMARY

In a first aspect of the present disclosure, there is provided a method for issuing a multimedia content. The method comprises: receiving a push content associated with a user, the push content being generated based on an occurrence of a personalized event associated with the user; presenting the push content to the user, the push content comprising a video content related to the personalized event; and issuing a multimedia content associated the personalized event based on an operation on the push content by the user, the multimedia content being generated based on the push content.

In a second aspect of the present disclosure, there is provided a method for issuing a multimedia content. The method comprises: presenting a multimedia content on a play page in response to a viewing request on the multimedia content by a third user, the multimedia content being issued based on a push content for a first user, and the push content being generated based on an occurrence of a personalized event associated with the first user and comprising a video content related to the personalized event; receiving a selection of a video reply entry in the play page by the third user; and presenting a video creation page in response to the selection, the video creation page being used for generating a reply video to the multimedia content.

In a third aspect of the present disclosure, there is provided an apparatus for issuing a multimedia content. The apparatus comprises: a push content receiving module configured to receive a push content associated with a user, the push content being generated based on an occurrence of a personalized event associated with the user; a push content presentation module configured to present the push content to the user, the push content comprising a video content related to the personalized event; and a multimedia content issuing module configured to issue a multimedia content associated with the personalized event based on an operation on the push content by the user, the multimedia content being generated based on the push content.

In a fourth aspect of the present disclosure, there is provided an apparatus for replying to a multimedia content. The apparatus comprises: a multimedia content presentation module configured to present the multimedia content on a play page in response to a viewing request on the multimedia content by a third user, the multimedia content being issued based on a push content for a first user, and the push content being generated based on an occurrence of a personalized event associated with the first user and comprising a video content related to the personalized event; a selection receiving module configured to receive a selection on a video reply entry in the play page by the third user; and a page presentation module configured to present a video creation page in response to the selection, the video creation page being used for generating a reply video to the multimedia content.

In a fifth aspect of the present disclosure, there is provided an electronic device, comprising: a memory and a processor; wherein the memory is used to store one or more computer instructions, wherein the one or more computer instructions are executed by the processor to implement the method of the first aspect.

In a sixth aspect of the present disclosure, there is provided an electronic device, comprising: a memory and a processor; wherein the memory is used to store one or more computer instructions, wherein the one or more computer instructions are executed by the processor to implement the method of the second aspect.

In a seventh aspect of the present disclosure, there is provided a computer-readable storage medium having one or more computer instructions stored thereon, wherein the one or more computer instructions are executed by a processor to implement the method of the first aspect.

In an eighth aspect of the present disclosure, there is provided a computer-readable storage medium having one or more computer instructions stored thereon, wherein the one or more computer instructions are executed by a processor to implement the method of the second aspect.

In a ninth aspect of the present disclosure, there is provided a computer program product comprising one or more computer instructions, wherein the one or more computer instructions are executed by a processor to implement the method of the first aspect.

In a tenth aspect of the present disclosure, there is provided a computer program product comprising one or more computer instructions, wherein the one or more computer instructions are executed by a processor to implement the method of the second aspect.

According to various embodiments of the present disclosure, on the one hand, the user can be effectively helped to create a multimedia content associated with a personalized event, and the time cost can be reduced for the user. This can effectively guide the interaction between users, thereby improving the user experience. On the other hand, it is convenient for the user to quickly create a reply video to such multimedia content, which improves the creative efficiency of the user.

BRIEF DESCRIPTION OF THE DRAWINGS

Through the following detailed description with reference to the accompanying drawings, the above and other features, advantages, and aspects of various embodiments of the present disclosure will become more apparent. In the drawings, the same reference numerals refer to the same or like elements, wherein

FIGS. 3A-3B illustrate example interfaces for issuing a multimedia content according to some further embodiments of the present disclosure;

DETAILED DESCRIPTION OF EMBODIMENTS

Figure 1:
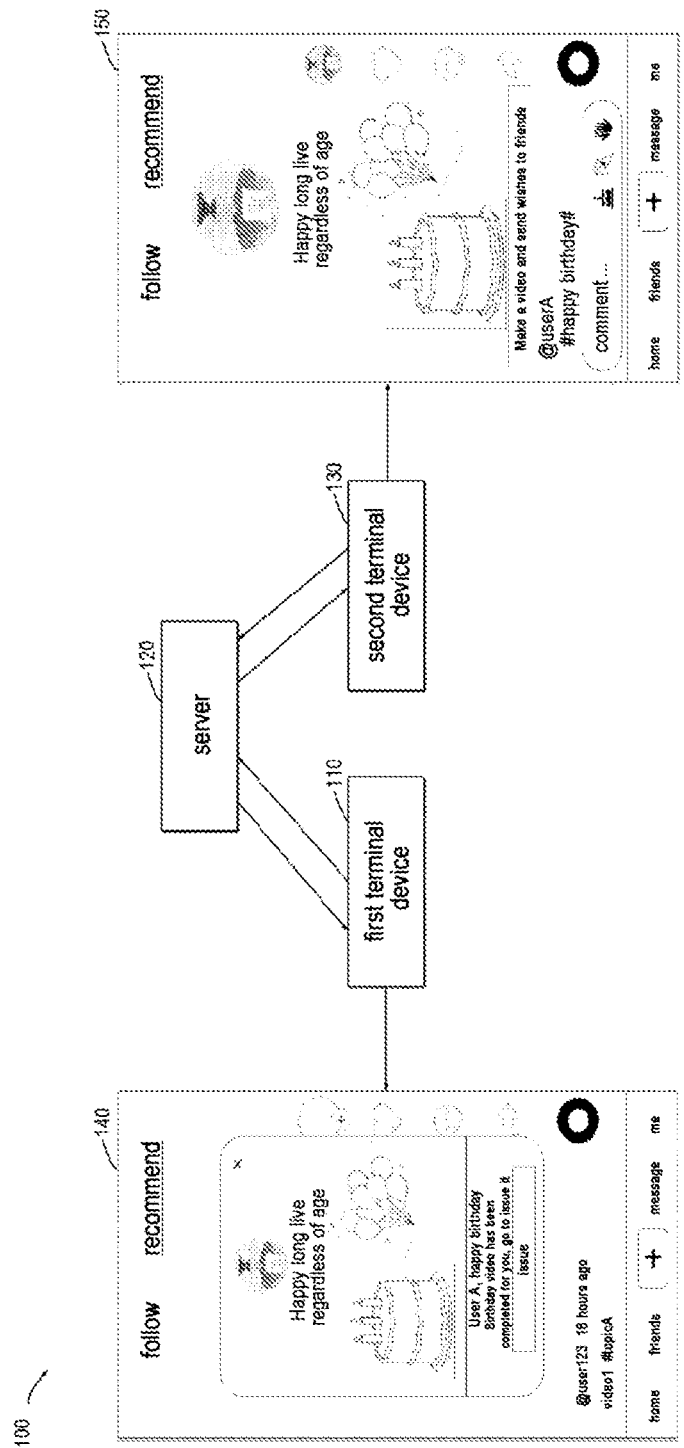
FIG. 1 illustrates a schematic diagram of an example environment in which various embodiments of the present disclosure herein can be implemented.

Embodiments of the present disclosure will be described in more details below with reference to the drawings. Although the drawings illustrate embodiments of the present disclosure, it should not be limited to the embodiments explained herein. On the contrary, the embodiments are provided to make the present disclosure more thorough and complete and to fully convey the scope of the present disclosure to those skilled in the art. It should be understood that the drawings and embodiments of the present disclosure are only for exemplary purposes, and are not intended to limit the protection scope of the present disclosure.

As used herein, the term "comprises" and its variants are to be read as open-ended terms that mean "comprises, but is not limited to." The term "based on" is to be read as "based at least in part on." The terms "one embodiment" and "the embodiment" are to be read as "at least one embodiment." The terms "first", "second" and so on can refer to same or different objects. The following text also can comprise other explicit and implicit definitions.

In recent years, more and more users create, share, view, or comment on a multimedia content via multimedia applications. For example, a user can create a birthday-related multimedia content on his/her birthday, and other users can also send their own wishes by replying to such multimedia content.

However, on the one hand, the user may not notice that the day has such a specific meaning, for example, the user may not notice that it is the first anniversary of his registration of the multimedia application. On the other hand, it usually takes a lot of time for the user to create videos related to such events. For example, the user may need to collect material associated with such an event to create such a video, and requires relatively tedious editing. This will affect the user to create such multimedia content to a certain extent.

To at least partially address one or more of the above problems and other potential problems, example embodiments of the present disclosure propose a solution for issuing a multimedia content. In general, according to embodiments described herein, a push content associated with a user may be received, where such push content is generated based on an occurrence of a personalized event (e.g., birthday, 1st anniversary of registration, 1st anniversary following each other with friends, etc.) associated with the user. The user may then be presented with push content, such push content includes s video content related to the personalized event. Then, an operation on the push content by the user can be received, and the multimedia content associated with the personalized event can be issued based on such operation.

On the other hand, embodiments of the present disclosure also provide a solution for replying to a multimedia content. According to embodiments described herein, when another user requests to view such multimedia content, the multimedia content may be presented on a play page. Further, when another user selects a video reply entry in the play page, a video creation page may be presented in response to the selection, where the video creation page is used for generating a reply video to the multimedia content.

Based on this approach, the solution of the present disclosure pushes generated content to the user automatically when the personalized event occurs, and enables the user to quickly issue a multimedia content related to the personalized event based on such push content. This can reduce the time cost for the user and improve the user experience. In addition, the solution of the present disclosure also provides a method for quickly creating a reply video to such multimedia content, thereby effectively promoting interaction between users, and thereby obtaining a richer multimedia content created by users.

Embodiments of the present disclosure will be described in detail below with reference to the accompanying drawings.

Example Environment

FIG. 1 illustrates a schematic diagram of an example environment 100 in which various embodiments of the present disclosure can be implemented. The example environment 100 comprises a server 120 and a first terminal device 110 and a second terminal device 130 communicatively coupled with the server 120. In some implementations, the server 120 may, for example, provide services associated with multimedia. The first terminal device 110 and the second terminal device 130 may be terminal devices associated with different users (e.g., different accounts in a multimedia application). Such terminal devices may be any suitable computing devices, examples of which comprise but not limited to: personal navigation devices ("PND"), portable navigation devices, mobile phones, personal digital assistants ("PDA"), wearable devices, tablet computers, notebook computer, and/or any other known or further developed mobile device or personal computer.

In some implementations, the first terminal device 110 and the second terminal device 130 may be installed with multimedia applications to enable respective users to edit, issue, view, share, and/or reply to a multimedia content via such multimedia applications.

Taking FIG. 1 as an example, the first terminal device 110 may be associated with a first user, for example. In some implementations, the server 120 may send the push content to the first terminal device 110 when the server 120 determines that a personalized event associated with the first user occurs.

For example, when the server 120 determines that the current day is the birthday of the first user, the server 120 may send the push content to the first terminal device 120 when the first user logs into the multimedia application using the first terminal device 110 on that day, so that the first terminal device 110 presents an interface 140, for example. The interface 140 may be, for example, a graphical user interface provided by the multimedia application.

Although FIG. 1 illustrates the push content associated with the event of the birthday of the first user, it should be understood that, as will be discussed below, such push content may also be associated with events of two different users. For example, the push content may be based on a determination that the current day is the first anniversary that the first user and another user (for ease of description, referred to as a second user) follow each other.

As shown in FIG. 1, the interface 140 may comprise a push content provided to the first user. For example, such push content may comprise, for example, a video related to birthday wishes, as well as other related element(s). The details of the push content will be introduced in detail below with reference to the drawings, and will not be described in detail here. This can allow the first user to issue the push content directly, or edit the push content before issuing.

After the first user issues the multimedia content, other users can view the issued multimedia content via the multimedia application. Exemplarily, the second terminal device 130 associated with a third user may present an interface 150 to the third user to provide the third user with the multimedia content issued by the first user. The interface 150 may be, for example, a graphical user interface provided by a multimedia application.

In some implementations, the interface 150 provides an entry for quickly capturing a reply video, so that the third user can be guided to create a reply video to the multimedia content. The details of creating a reply video will be described in detail below and will not be described in detail here.

The detailed process of issuing the multimedia content via the first terminal device 110 and replying to the multimedia content via the second terminal device 130 will be described in detail below.

Issuing Multimedia Content

In order to improve creation efficiency of the multimedia content, the first terminal device 110 can assist the user to efficiently issue the multimedia content by providing a push content to the user. An example implementation of issuing the multimedia content will be described below in conjunction with FIGS. 2-3.

As discussed above, in response to determining that a personalized event associated with the first user occurs, the server 120 may generate the push content automatically. It should be understood that, in some cases, such push content may also be automatically generated by the first terminal device 110, for example. For ease of description, the generation of the push content will be described below by taking the server 120 as an example.

In some implementations, the server 120 may obtain, for example, a personal profile of the first user and determine personalized time information associated with the first user from the personal profile. For example, the server may determine the birthday of the first user or the date when the first user registered for the multimedia application, etc. from the personal profile.

In some other implementations, the server 120 may also obtain schedule information of the first user, for example. In some examples, such schedule information may, for example, be entered by the user in a multimedia application, and the server 120 may obtain such schedule information upon obtaining the permission of the first user. In other examples, such schedule information may, for example, originate from other applications than the multimedia application, such as a schedule application in a mobile phone operating system. In the case of obtaining the permission of the first user, the server 120 may, for example, obtain the schedule information of the first user via an interface provided by the schedule application.

In some implementations, the server 120 may, for example, determine the personalized time information associated with the first user based on the schedule information of the first user. For example, the server 120 may determine that the first user will hold a wedding today according to the schedule information.

In still some other implementations, the server 120 may also determine the personalized time information according to historical operations of the first user in the multimedia application, for example. Such historical operations may comprise, for example, following the user(s), being followed by the user(s), issuing the multimedia content, sharing the multimedia content, commenting on the multimedia content, or any suitable operations. For example, in the case of obtaining the permission of the first user, the server 120 may obtain a date on which a first piece of multimedia content was issued by the first user. In another example, the server 120 may obtain a date on which the first user and another user (e.g., the second user) followed each other. In yet another example, in the case of obtaining the permission of the first user, the server 120 may determine a date of graduation of the first user according to a historical multimedia content issued by the first user, e.g., a video titled "graduated today".

It should be understood that the personalized time information discussed above is intended to indicate the personalized information of the first user, and it is not intended to comprise some general holiday information, such as New Year and the like.

Subsequently, the server 120 may determine the occurrence of the personalized event associated with the first user according to a comparison of the current time information and the personalized time information. For example, the server 120 may determine that today is the birthday of the first user, today is the first anniversary of the first user's registration, today is the first anniversary of the first user and the second user following each other, today is the wedding day of the first user, or today is the graduation anniversary of the first user, etc.

After determining that such personalized event occurs, the server 120 may, for example, generate a push content associated with the personalized event, and send the push content to the first terminal device 110.

Figures 2A, 2B, 2C, 2D:
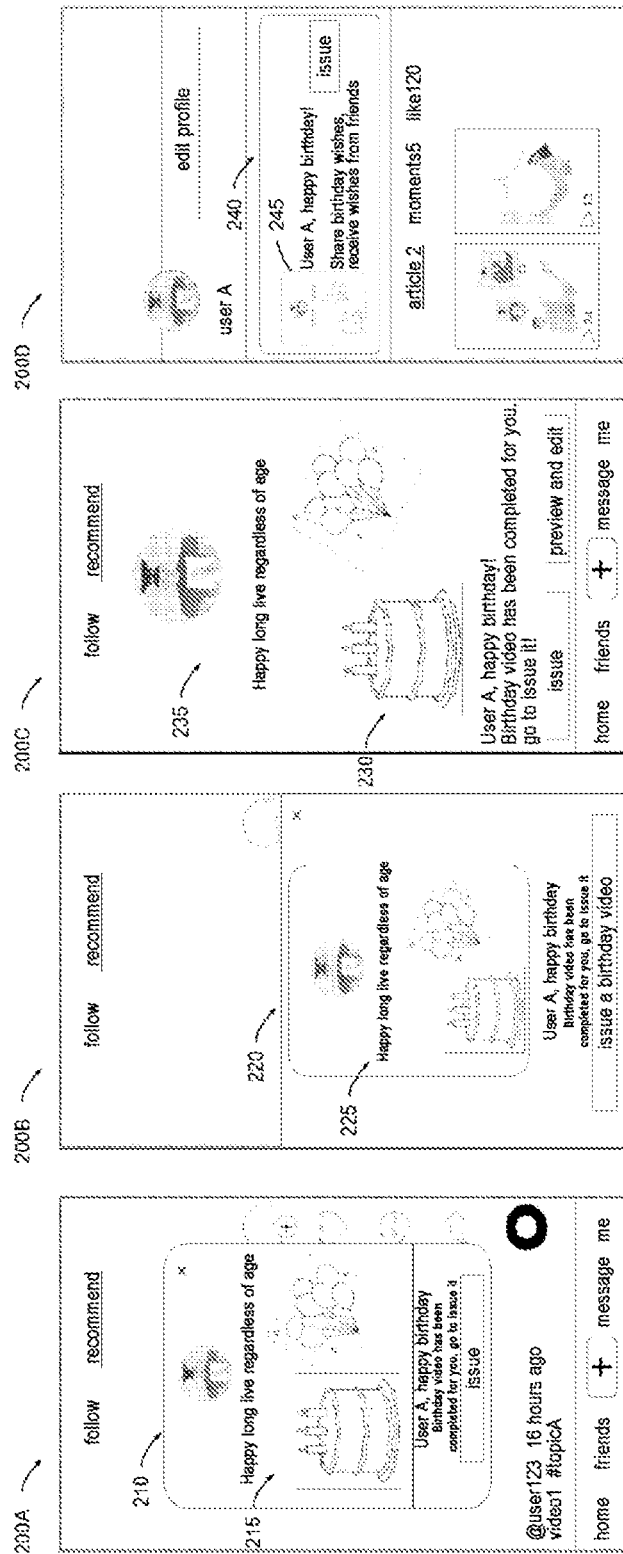
FIGS. 2A-2D illustrate example interfaces for presenting a push content according to some embodiments of the present disclosure.

FIGS. 2A-2D illustrate example interfaces for providing a push content according to some embodiments of the present disclosure. As shown in FIG. 2A, after receiving the push content from the server 120, the first terminal device 110 may present an interface 200A to the first user to provide the push content 210.

In the example shown in FIG. 2A, the first terminal device 110 may, for example, use a pop-up window in a multimedia application to provide the push content 210. As shown in FIG. 2A, the push content 210 may comprise a video content 215 related to the personalized event. For example, the video content 215 may be a video related to the topic "birthday."

It should be understood that when the determined personalized events are different, the video content 215 comprised in the push content 210 may have different content. For example, when the personalized event is the first user's 1st anniversary of graduation, the video content 215 may be related to the topic "graduation." When the personalized event is the first anniversary of the first user and the second user following each other, the video content 215 may be related to the topic of "follow each other".

In some implementations, the push content 210 may further comprise, for example, a visual element associated with the first user (for ease of description, referred to as a first visual element). In some instances, the first visual element may comprise an image associated with the first user, e.g., a current avatar of the first user, the first user's a historical avatar of the first user, a photo used to be posted by the first user, or a screenshot of a video used to be posted by the first user, etc.

Alternatively or additionally, the first visual element may also comprise a text for indicating an identification of the first user. For example, the first visual element may comprise a current nickname of the first user, a historical nickname of the first user, or a name of the first user, etc.

In some implementations, the push content 210 may also comprise a text for directing the first user to post or edit. For example, the push content 210 may comprise "a birthday video has been made for you, go to issue it", so that the first user can quickly understand the function of the push content 210.

In yet another implementation, the generated push content 210 may also be personalized customized based on an attribute of the first user. For example, the video content for birthday in the push content received by male and female may be in different forms. In yet another example, when it is determined to be the graduation anniversary of the first user, the video content may comprise an element related to a school where the first user graduated from, such as a school logo of the school. Such school information can be determined according to, for example, the user's profile or a multimedia content that the user has issued. For example, if the user has issued a multimedia content titled "Today I graduated from University A!", the pushed video content may comprise an element related to "University A".

It should be understood that the first terminal device 110 may also provide the push content in other forms. In one example, as shown in FIG. 2B, the first user terminal device 110 may present an interface 200B to provide a push content 220 comprising a video content 225 by using a floating window in the multimedia application. In this way, the provided push content 220 can be more easily noticed by the first user.

In another example, as shown in FIG. 2C, the first user terminal device 110 may present an interface 200C to provide a push content 230 comprising a video content 235 on a content recommendation page in the multimedia application. In this way, interaction of the first user can be made more in line with his/her usage habits without an abrupt for the interaction.

In yet another example, as shown in FIG. 2D, the first user terminal device 110 may present an interface 200D to provide a push content 240 comprising a video content 245 on a personal homepage of the first user in the multimedia application. In this way, intrusiveness of the interface can be reduced, thereby reducing possible interruption to users with weak creative intentions.

It should be understood that other suitable means may also be used for providing the push content. Furthermore, FIGS. 2A-2D are merely examples of personalized events associated with a single user. It should be understood that the determined personalized event may also be associated with multiple users, as discussed above. For example, the personalized event may be the first anniversary of the first user and the second user following each other. Correspondingly, the push content may comprise, for example, a visual element (referred to as a second visual element for ease of description) associated with the second user.

In some embodiments, the second visual element may comprise an image associated with the second user, such as a current avatar of the second user, a historical avatars of the second user, a photo used to be posted by the second user, or a screenshot of a video used to be posted by the second user, etc.

Alternatively or additionally, the second visual element may also comprise a text for indicating an identification of the second user. For example, the second visual element may comprise a current nickname of the second user, a historical nickname of the second user, or a name of the second user, and the like.

Alternatively, when a personalized event (e.g., first anniversary of the creation of a group of multiple users) is associated with multiple users, the push content may also comprise visual elements (e.g., avatars of each user) associated with the multiple users respectively, or a visual element (for example, a picture or a name of the group) relevant to multiple users.

In some implementations, the push content may also comprise information about a historical operation of the first user in the multimedia application. For example, when the personalized event is "the first anniversary of registration", the push content may comprise information of, such as, how many multimedia contents have been sent by the first user within one year of registration, how many users followed, how many users following, and the amount of playing/replying to/reposting multimedia contents. Alternatively, when the personalized event is the "the first anniversary of following each other", the push content may comprise, for example, the number of likes, comments, and reposts between the first user and the second user during the period when the first user and the second user following each other.

In some implementations, the first user may perform a predetermined operation on the push content. In some implementations, a video content comprised in the push content may be auto-played, for example. Alternatively, the video content may be played in response to a click by the first user.

When the first user, for example, determines that the provided video content has met his/her expectation, the first user can directly issue the push content as the multimedia content by clicking a button associated with an issuing function, without going through steps such as complicated edit or adding description.

Accordingly, after the multimedia content is issued, such the multimedia content may be automatically added with a description associated with the personalized event. Taking the personalized event "birthday" as an example, a description of the issued multimedia content, for example, can be automatically determined as "#happy birthday#" without additional editing by the user.

In aome other implementations, the first user may also choose to edit the push content, for example. Exemplarily, the first user may enter the editing interface by clicking a button related to the editing operation or by clicking or long-pressing a specific part of the push content.

FIG. 3A illustrates an example editing interface 300A according to some embodiments of the present disclosure. As shown in FIG. 3A, the editing interface 300A provides multiple editing functions to adjust corresponding elements within the push content.

For example, the first user can also click a button 324 to toggle a template corresponding to the push content. For example, when the first user chooses to replace "topic A" with "topic B" corresponding to another content template, a video content, a text content, an image content, a background music or a layout in the push content can all be replaced to predetermined contents corresponding to "topic B".

For example, in "topic B", the background music can be changed from "Gong Xi Fa Cai" to "Good Day", the position of the user image 322 can also be changed from an upper part of the video content to a bottom of the video content, etc. "Happy long live regardless of age" can also be replaced with "Happy birthday" etc. By providing multiple preset content templates, personalized content can be provided to the user, and time cost of content editing can be reduced for the user.

In yet another implementation, the first user may also edit one or more of the elements individually. For example, the editing interface 300A may provide a plurality of editing controls, e.g., a word control 310, a sticker control 312, a special effect control 314, a filter control 316, and the like. The first user can edit the push content through these editing controls. For example, the first user can click the word control 310 to add, delete or change word(s) comprised in the video content, click the sticker control 312 to add, delete or change sticker(s) comprised in the video content, click the special effect control 314 to add, delete or change special effect(s) applied to the video content, or click the filter control 316 to adjust filter(s) applied to the video content.

In addition, the first user can also click the interface element 318 to expand more editing controls to obtain more editing functions. It should be understood that the editing interface may provide more or fewer editing controls. These editing functions can be applied to the entire video content or to a portion of the video content, e.g., one or more video frames or a specific window of the video content.

In addition, the first user can also click a button 326 to replace the user image 322, or click the text 320 to replace background music, for example. In this way, the user can perform partial personalized modification on the basis of the push content, which can not only reduce the user's editing cost, but also make created content more personalized.

In some implementations, after completing editing of the push content, the first user can issue the edited content directly by clicking a button 328, for example, without additionally supplementing the description of the multimedia content.

In some other implementations, optionally, the first user can also supplement a description about the multimedia content to be issued by clicking a button 330. FIG. 3B illustrates an example interface 300B for adding a description in accordance with some embodiments of the present disclosure. As shown in FIG. 300B, the first user may, for example, edit the description 340 about the multimedia content. In some implementations, the first terminal device 110 can automatically fill in a string of text as a candidate description, thereby reducing editing costs for the user.

In addition, the first user can also change a cover of the multimedia content by clicking a control 350. In addition, the first user may also add a description of a position of the multimedia content, or may set a user group who can view the multimedia content.

After completing editing of the multimedia content, the first user may, for example, click a button 370 to issue the multimedia content. Alternatively, the first user can also save the edited multimedia content as a draft by clicking a button 360.

Through manners of issuing the multimedia content discussed above, embodiments of the present disclosure can effectively remind a user of a personalized event related to a current date. In addition, by providing the user with the push content related to the personalized event, the embodiments of the present disclosure can also guide the user to efficiently create the multimedia content related to the personalized event, thereby reducing a time cost for the user and improving a creation experience of the user.

Reply to the Multimedia Content

In order to improve an efficiency of replying to the multimedia content, the second terminal device 130 can assist the user to reply to the multimedia content efficiently by providing the user with a quick video reply entry. An example implementation of replying to the multimedia content will be described below in conjunction with FIGS. 4-5.

Figure 4:
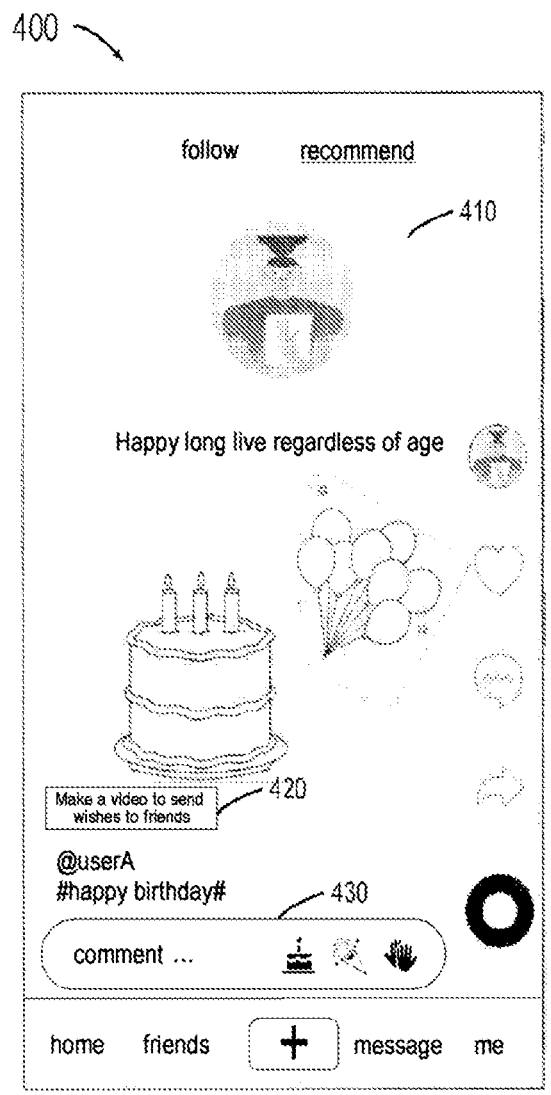
FIG. 4 illustrates an example interface for playing a multimedia content according to some embodiments of the present disclosure.

After the first user issues the multimedia content, another user (e.g., a third user) can view the multimedia content issued by the first user via the second terminal device 130. FIG. 4 illustrates an example interface 400 for playing the multimedia content in accordance with some embodiments of the present disclosure. As shown in FIG. 4, the interface 400 (also referred to as a play page) may be used, for example, for playing the issued multimedia content 410. In some implementations, interface 400 may be presented automatically by the multimedia application. Alternatively, the interface 400 may also be presented in response to a specific operation by the third user.

As shown in FIG. 4, the interface 400 also comprises a comment control 430. The third user may utilize the comment control 430 to generate a comment on the multimedia content 410. In some implementations, the comment control 430 may further provide one or more emoticon reply controls, to enable the user to generate a comment on the multimedia content 410 quickly when the user clicks the corresponding emoticon reply control.

In some implementations, depending on a type of the personalized event associated with the multimedia content 410, the emoticon reply controls presented in the interface 400 may also vary. For example, if the personalized event is "birthday", the provided emoticon reply control can be used for inputting an emotion such as "cake," "sprinkle flowers," or "applaud." In addition, if the personalized event is "graduation day", the provided emoticon reply control can be used for inputting an emoticon such as "bachelor's uniform" or "bachelor's hat".

In some implementations, the interface 400 also provides a control 420 (also referred to as a video reply entry) for quickly generating a reply video to the multimedia content 410. When the third user clicks the video reply entry 420, the third user will be directed to a video creation interface for shooting a reply video. In this way, the user can be efficiently guided to create an interactive content, the time cost for the user to create a video can be reduced, and the user experience can be improved.

In some implementations, the video creation interface may provide the third user with a personalized visual element associated with the personalized event. For example, unlike a common shooting video interface, the video creation interface may initially provide props (e.g., a cake) associated with "birthday wishes" to enable the third user to quickly create a birthday-wishes video. In this way, the created reply video can be more in line with the topic of the personalized event, and steps for the user to select a related visual element are simplified.

Figure 5:
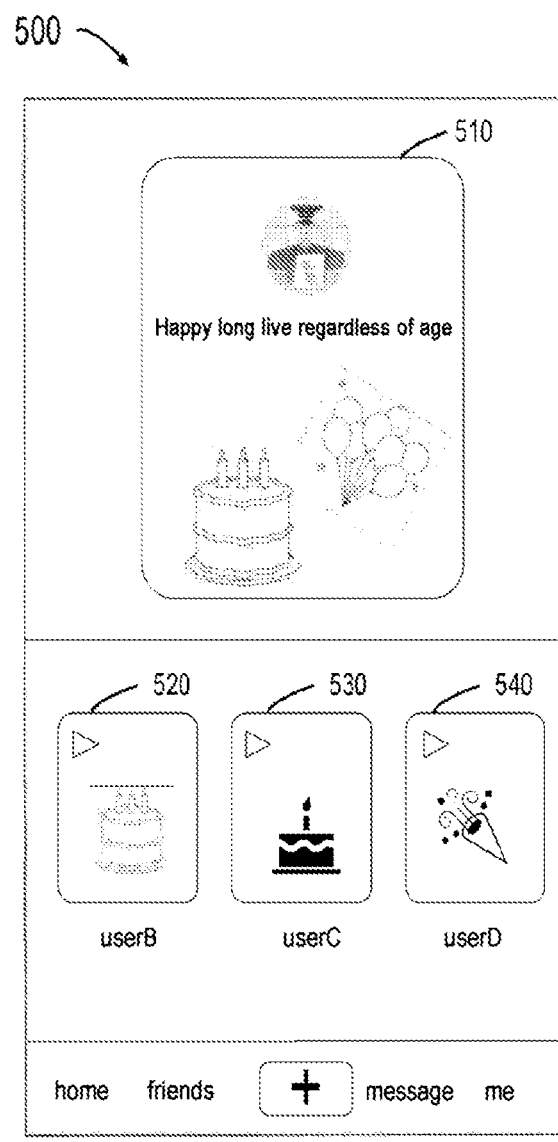
FIG. 5 illustrates an example interface for presenting a reply video according to some further embodiments of the present disclosure.

In some implementations, after the third user issues the reply video to the multimedia content 410, one or more reply videos to the same multimedia content 410 may be presented in aggregate. FIG. 5 illustrates an example interface 500 for presenting a reply video according to some further embodiments of the present disclosure. As shown in FIG. 5, the interface 500 (also referred to as a reply overview interface 500) may, for example, present visual elements 510 corresponding to the multimedia content 410, and play entries 520, 530, and 540 associated with different reply videos.

In some implementations, the interface 500 may be presented on the first terminal device 110 in response to a viewing operation by the first user. In this example, the interface 500 may also be referred to as a "first reply overview interface."

In some implementations, the first reply overview interface may present some or all of the reply videos to the multimedia content 410. For example, the first reply overview interface may present all of the reply videos. Alternatively, the first reply overview interface may present the reply videos issued within a predetermined time period (e.g., the latest 24 hours).

When the first user clicks the play entries 520, 530 or 540, the corresponding reply video can be played in the first reply overview interface. Alternatively, the first user may also be directed to another interface to view the corresponding reply video.

In some other implementations, for example, the interface 500 may also be presented on the second terminal device 130 in response to a viewing operation by the third user. In this example, the interface 500 may also be referred to as a "second reply overview interface."

In some implementations, the second reply overview interface may present some or all of the reply videos to the multimedia content 410.

For example, the second reply overview interface may present all of the reply videos to the multimedia content. Alternatively, the interface 500 may present the reply videos issued within a predetermined time period (e.g., the latest 24 hours). For example, the second reply overview interface browsed by the third user may only comprise reply videos issued by other users (e.g., users following each other with the third user) associated with the third user. The reply videos issued by other unrelated users may not be visible to the third user. Based on such a manner, other users can only view the reply contents issued by the related users.

In some implementations, a range of the reply videos that the third user can view may be specified by the first user, for example. For example, the first user who issues the multimedia content may specify that the poster of the reply video (e.g., the third user) can view only the reply videos issued by the users following each other with the third user, can view all the reply videos, or is not allowed to view the reply videos issued by other users, etc.

Similarly, when the third user clicks the play entries 520, 530 or 540 in the second reply overview interface, the corresponding reply video can be played in the second reply overview interface. Alternatively, the third user may also be directed to another interface to view the corresponding reply video.

Through such an aggregation method, it can more effectively promote different users to browse the multimedia content associated with the same personalized event, thereby promoting an interaction between different users, and further improving the user experience.

Example Processes, Apparatus and Device

Figure 6:
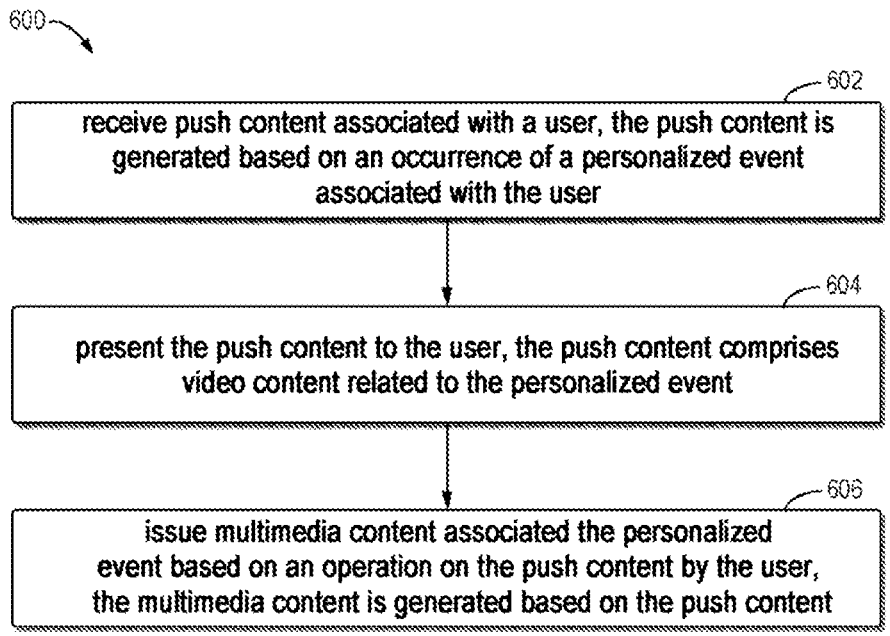
FIG. 6 illustrates a flowchart of an example process for issuing a multimedia content according to some embodiments of the present disclosure.

FIG. 6 illustrates a flowchart of an example process for issuing a multimedia content according to some embodiments of the present disclosure. The process 600 may be implemented by, for example, the first terminal device 110 in FIG. 1.

As shown in FIG. 6, at block 602, the first terminal device 110 receives a push content associated with a user, where the push content is generated based on an occurrence of a personalized event associated with the user.

At block 604, the first terminal device 110 presents the push content to the user, where the push content comprises a video content related to the personalized event.

At block 606, the first terminal device 110 issues the multimedia content associated with the personalized event based on an operation on the push content by the user, where the multimedia content is generated based on the push content.

In some implementations, the occurrence of the personalized event is determined based on current time information and personalized time information associated with the user, the personalized time information is determined based on at least one of: a personal profile of the user, schedule information associated with the user, and a historical operation of the user in a multimedia application.

In some implementations, the push content further comprises a first visual element associated with the user, where the first visual element comprises at least one of: an image associated with the user; and a text indicating an identification of the user.

In some implementations, the user is a first user, the personalized event is related to both the first user and a second user, and the push content further comprises a second visual element associated with the second user.

In some implementations, presenting the push content comprises at least one of: presenting the push content using a pop-up window in a multimedia application; presenting the push content using a floating window in the multimedia application; presenting the push content on a personal homepage of the user in the multimedia application; and presenting the push content on a content recommendation page in the multimedia application.

In some implementations, issuing the multimedia content associated the personalized event comprises: in response to the user selecting to issue the push content directly, issuing the push content as the multimedia content, the multimedia content being added with a description associated with the personalized event.

In some implementations, issuing the multimedia content associated with the personalized event comprises: in response to an editing request on the push content by the user, adjusting at least one element of the push content, where the at least one element comprises: a video, a music, a text, or an image.

In some implementations, adjusting at least one element in the push content comprises: in response to a selection of a predetermined content template by the user, adjusting the at least one element in the push content to an element corresponding to the predetermined content template.

In some implementations, in response to a viewing operation by the user, presenting a first reply overview page associated with the multimedia content, the first reply overview page providing a playback entry associated with a set of reply videos to the multimedia content, the playback entry being used for directing to play a corresponding reply video.

Figure 7:
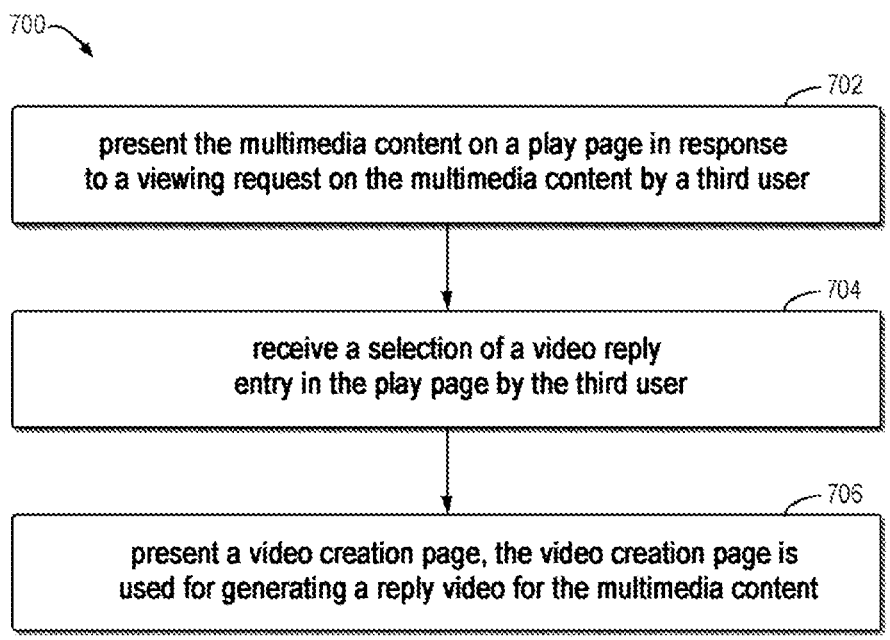
FIG. 7 illustrates a flowchart of an example process for replying to a multimedia content according to some embodiments of the present disclosure.

FIG. 7 illustrates a flowchart of an example process 700 for replying to the multimedia content according to some embodiments of the present disclosure. The process 700 may be implemented, for example, by the second terminal device 130 in FIG. 1.

As shown in FIG. 7, at block 702, the second end device 130 presents a multimedia content on a play page associated with a third user, where the multimedia content is issued based on a push content for a first user, and the push content is generated based on an occurrence of a personalized event associated with the first user and comprises a video content related to the personalized event.

At block 704, the second end device 130 receives a selection of a video reply entry in the play page by the third user.

At block 707, the second end device 130 presents a video creation page in response to the selection, where the video creation page is used for generating a reply video to the multimedia content.

In some implementations, presenting the video creation page comprises: initially providing a personalized visual element associated with the personalized event in the video creation page, where the personalized visual element is used for generating the reply video.

In some implementations, the second end device 130, in response to a viewing operation by the third user, presents a second reply overview page associated with the multimedia content, where the second reply overview page provides a playback entry associated with a set of reply videos to the multimedia content, and the playback entry is used for directing to play a corresponding reply video.

Figure 8:
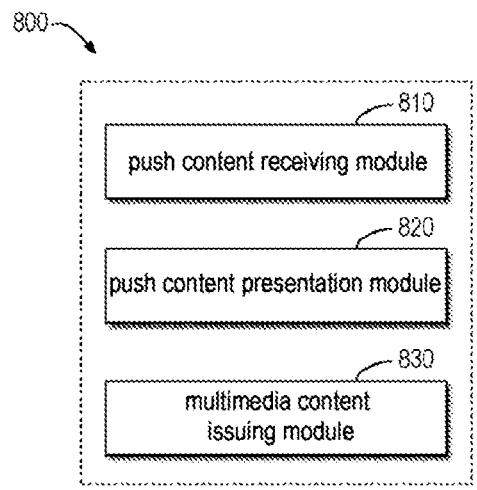
FIG. 8 illustrates a schematic structural block diagram of an apparatus for issuing a multimedia content according to some embodiments of the present disclosure.

Embodiments of the present disclosure also provide corresponding apparatuses for implementing the above-mentioned methods or processes. FIG. 8 illustrates a schematic structural block diagram of an apparatus 800 for issuing a multimedia content according to some embodiments of the present disclosure.

As shown in FIG. 8, the apparatus 800 includes a push content receiving module 810 configured to receive a push content associated with a user, where the push content is generated based on an occurrence of a personalized event associated with the user.

The apparatus 800 further includes a push content presentation module 820 configured to present the push content to the user, where the push content comprises a video content related to the personalized event.

In addition, the apparatus 800 further includes a multimedia content issuing module 830 configured to issue a multimedia content associated with the personalized event based on an operation on the push content by the user, where the multimedia content is generated based on the push content.

Figure 9:
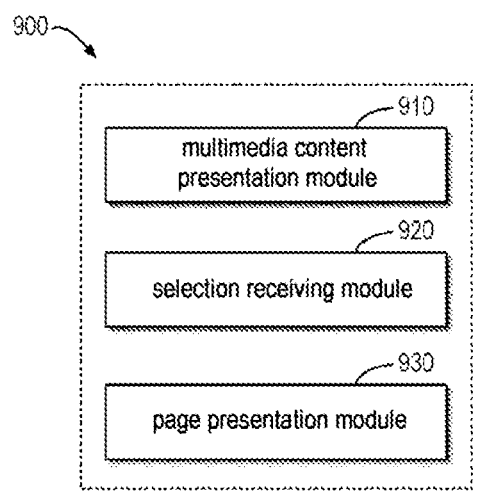
FIG. 9 illustrates a schematic structural block diagram of an apparatus for replying to a multimedia content according to some embodiments of the present disclosure.

FIG. 9 illustrates a schematic structural block diagram of an apparatus 900 for replying to a multimedia content according to some embodiments of the present disclosure.

As shown in FIG. 9, the apparatus 900 includes a multimedia content presentation module 910 configured to present the multimedia content on a play page in response to a viewing request on the multimedia content by a third user, where the multimedia content is issued based on a push content for a first user, and the push content is generated based on an occurrence of a personalized event associated with the first user and comprises a video content related to the personalized event.

The apparatus 900 further includes a selection receiving module 920 configured to receive a selection of a video reply entry in the play page by the third user.

The apparatus 900 further includes a page presentation module 930 configured to present a video creation page in response to the selection, where the video creation page is used for generating a reply video to the multimedia content.

Figure 10:
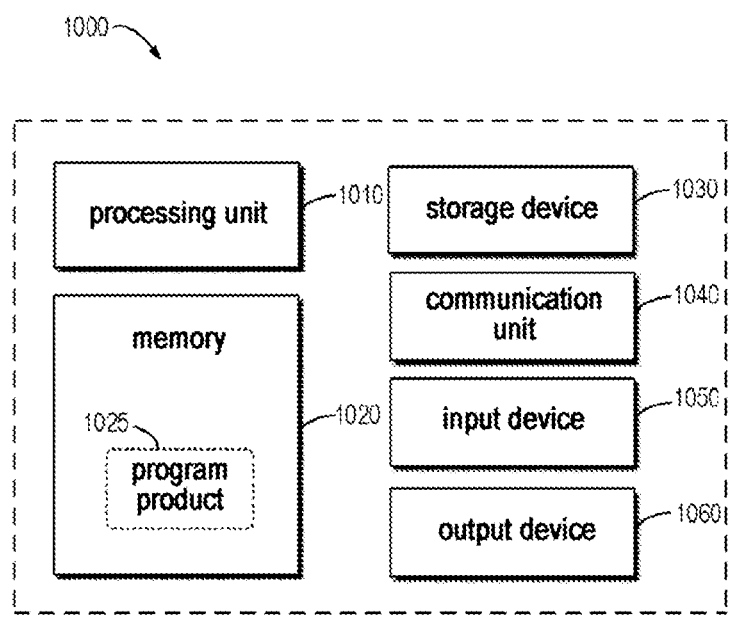
FIG. 10 illustrates a block diagram of a computing device capable of implementing various embodiments of the present disclosure.

FIG. 10 illustrates a block diagram of a computing device/server 1000 in which one or more embodiments of the present disclosure may be implemented. It should be understood that the computing device/server 1000 shown in FIG. 10 is merely exemplary and should not constitute any limitation on the function and scope of the embodiments described herein.

As shown in FIG. 10, the computing device/server 1000 is in the form of a general-purpose computing device. Components of the computing device/server 1000 may include, but not limited to, one or more processors or processing units 1010, a memory 1020, a storage device 1030, one or more communication units 1040, one or more input devices 1050, and one or more output device 1060. The processing unit 1010 may be an actual or virtual processor and can perform various processes according to programs stored in the memory 1020. In a multi-processor system, multiple processing units execute computer-executable instructions in parallel to increase the parallel processing capability of the computing device/server 1000.

The computing device/server 1000 typically includes a number of computer storage media. Such media can be any available media accessible by the computing device/server 1000, including but not limited to, volatile and nonvolatile media, removable and non-removable media. The memory 1020 may be a volatile memory (e.g., register, cache, random access memory (RAM)), a non-volatile memory (e.g., read only memory (ROM), electrically erasable programmable read only memory (EEPROM), Flash) or a combination thereof. The storage device 1030 may be removable or non-removable media, and may include machine-readable media, such as a flash drive, a magnetic disk, or any other media that may be capable of storing information and/or data (e.g., training data for training) and can be accessed within the computing device/server 1000.

The computing device/server 1000 may further include additional removable/non-removable, volatile/non-volatile storage media. Although not shown in FIG. 10, a disk drive may be provided for reading or writing from a removable, non-volatile magnetic disk (e.g., "floppy disk"), and an optical drive may be provided for reading or writing from a removable, non-volatile optical disk. In these cases, each drive may be connected to a bus (not shown) via one or more data media interfaces. The memory 1020 may include a computer program product 1025 having one or more program modules configured to perform various methods or actions of various embodiments of the present disclosure.

The communication unit 1040 enables communication with other computing devices through a communication medium. Additionally, the functions of the components of the computing device/server 1000 may be implemented in a single computing cluster or multiple computing machines capable of communicating through a communication connection. Accordingly, the computing device/server 1000 may operate in a networked environment using logical connections to one or more other servers, network personal computers (PCs), or another network node.

The input device 1050 may be one or more input devices, such as a mouse, a keyboard, a trackball, and the like. The output device 1060 may be one or more output devices, such as a display, a speaker, a printer, and the like. The computing device/server 1000 may also communicate with one or more external devices (not shown), such as a storage device, a display device, etc., through the communication unit 1040, as required, thereby enable the computing device/server 1000 to communicate with one or more devices that interact with users, or enable the computing device/server 1000 to communicate with any of one or more other devices (e.g., a network card, a modem, etc.). Such communication may be performed via an input/output (I/O) interface (not shown).

According to an exemplary implementation of the present disclosure, there is provided a computer-readable storage medium having one or more computer instructions stored thereon, where the one or more computer instructions are executed by a processor to implement the above-described method.

Various aspects of the present disclosure are described here with reference to a flow chart and/or a block diagram of a method, an apparatus (a system) and a computer program product according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, comprising instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code comprise one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method for issuing a multimedia content, comprising:
receiving a push content associated with a user, the push content being generated based on an occurrence of a personalized event associated with the user;
presenting the push content to the user, the push content comprising a video content related to the personalized event, wherein the occurrence of the personalized event is determined based on current time information and personalized time information associated with the user;
receiving an operation on the push content by the user, the operation comprising editing the push content;
generating the multimedia content associated with the personalized event based on the push content and the operation on the push content; and
issuing the multimedia content associated with the personalized event.

2. The method of claim 1, wherein the personalized time information is determined based on at least one of:
a personal profile of the user,
schedule information associated with the user, or
a historical operation of the user in a multimedia application.

3. The method of claim 1, wherein the push content further comprises a first visual element associated with the user,
wherein the first visual element comprises at least one of:
an image associated with the user; or
a text indicating an identification of the user.

4. The method of claim 3, wherein the user is a first user, the personalized event is related to both the first user and a second user, and the push content further comprises a second visual element associated with the second user.

5. The method of claim 1, wherein presenting the push content comprises at least one of:
presenting the push content using a pop-up window in a multimedia application;

presenting the push content using a floating window in the multimedia application;
presenting the push content on a personal homepage of the user in the multimedia application; or
presenting the push content on a content recommendation page in the multimedia application.

6. The method of claim 1, wherein issuing the multimedia content associated with the personalized event comprises:
in response to an editing request on the push content by the user, adjusting at least one element of the push content,
wherein the at least one element comprises: a video, a music, a text, or an image.

7. The method of claim 6, wherein adjusting at least one element in the push content comprises:
in response to a selection of a predetermined content template by the user, adjusting the at least one element in the push content to an element corresponding to the predetermined content template.

8. The method of claim 1, further comprising:
in response to a viewing operation by the user, presenting a first reply overview page associated with the multimedia content, the first reply overview page providing a playback entry associated with a set of reply videos to the multimedia content, the playback entry being used for directing to play a corresponding reply video.

9. A computer-readable storage medium having one or more computer instructions stored thereon, wherein the one or more computer instructions executed by a processor cause an electronic device to:
receive a push content associated with a user, the push content being generated based on an occurrence of a personalized event associated with the user, wherein the occurrence of the personalized event is determined based on current time information and personalized time information associated with the user;
present the push content to the user, the push content comprising a video content related to the personalized event;
receive an operation on the push content by the user, the operation comprising editing the push content;
generate the multimedia content associated with the personalized event based on the push content and the operation on the push content; and
issue the multimedia content associated with the personalized event.

10. The computer-readable storage medium of claim 9, wherein the personalized time information is determined based on at least one of:
a personal profile of the user,
schedule information associated with the user, or
a historical operation of the user in a multimedia application.

11. The computer-readable storage medium of claim 9, wherein the push content further comprises a first visual element associated with the user,
wherein the first visual element comprises at least one of:
an image associated with the user; or
a text indicating an identification of the user.

12. The computer-readable storage medium of claim 11, wherein the user is a first user, the personalized event is related to both the first user and a second user, and the push content further comprises a second visual element associated with the second user.

13. The computer-readable storage medium of claim 9, wherein the one or more computer instructions executed by a processor cause the electronic device to present the push content by at least one of:
presenting the push content using a pop-up window in a multimedia application;
presenting the push content using a floating window in the multimedia application;
presenting the push content on a personal homepage of the user in the multimedia application; or
presenting the push content on a content recommendation page in the multimedia application.

14. The computer-readable storage medium of claim 9, wherein the one or more computer instructions executed by a processor cause the electronic device to:
in response to an editing request on the push content by the user, adjust at least one element of the push content,
wherein the at least one element comprises: a video, a music, a text, or an image.

15. The computer-readable storage medium of claim 9, wherein the one or more computer instructions executed by a processor further cause the electronic device to:
in response to a viewing operation by the user, present a first reply overview page associated with the multimedia content, the first reply overview page providing a playback entry associated with a set of reply videos to the multimedia content, and the playback entry being used for directing to play a corresponding reply video.

16. A device comprising a processor configured to:
receive a push content associated with a user, the push content being generated based on an occurrence of a personalized event associated with the user;
present the push content to the user, the push content comprising a video content related to the personalized event, wherein the occurrence of the personalized event is determined based on current time information and personalized time information associated with the user;
receive an operation on the push content by the user, the operation comprising editing the push content;
generate the multimedia content associated with the personalized event based on the push content and the operation on the push content; and
issue the multimedia content associated with the personalized event.

17. The device of claim 16, wherein the personalized time information is determined based on at least one of:
a personal profile of the user,
schedule information associated with the user, or
a historical operation of the user in a multimedia application.

18. The device of claim 16, wherein the push content further comprises a first visual element associated with the user,
wherein the first visual element comprises at least one of:
an image associated with the user; or
a text indicating an identification of the user.

* * * * *